March 7, 1967  J. M. ROUBEROL ETAL  3,308,295
X-RAY SPECTROMETER WITH MEANS TO MAINTAIN THE
DISTANCE BETWEEN THE CRYSTAL ANALYZER
AND DETECTOR FIXED
Filed May 6, 1964  3 Sheets-Sheet 1
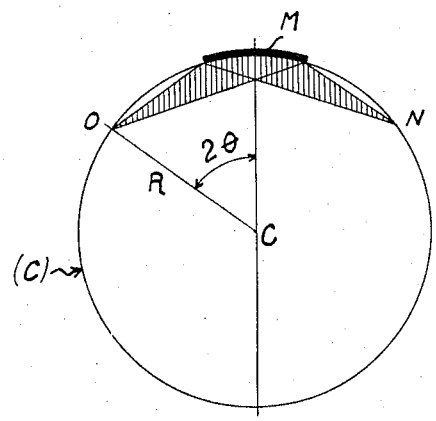
FIG. 1
FIG. 2
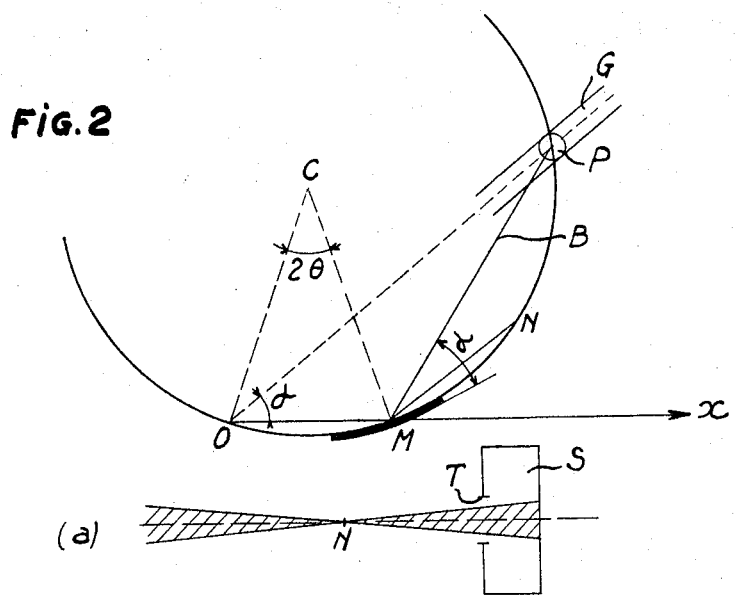
FIG. 3
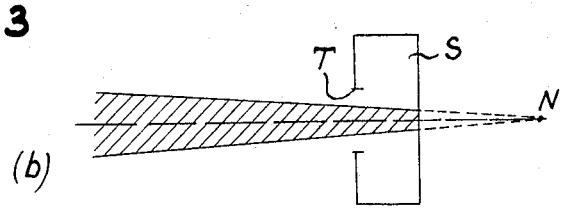
Inventors
Jean Michel Rouberol
Mathias Tong Yuan Tong
By Cushman, Darby & Cushman
attorneys

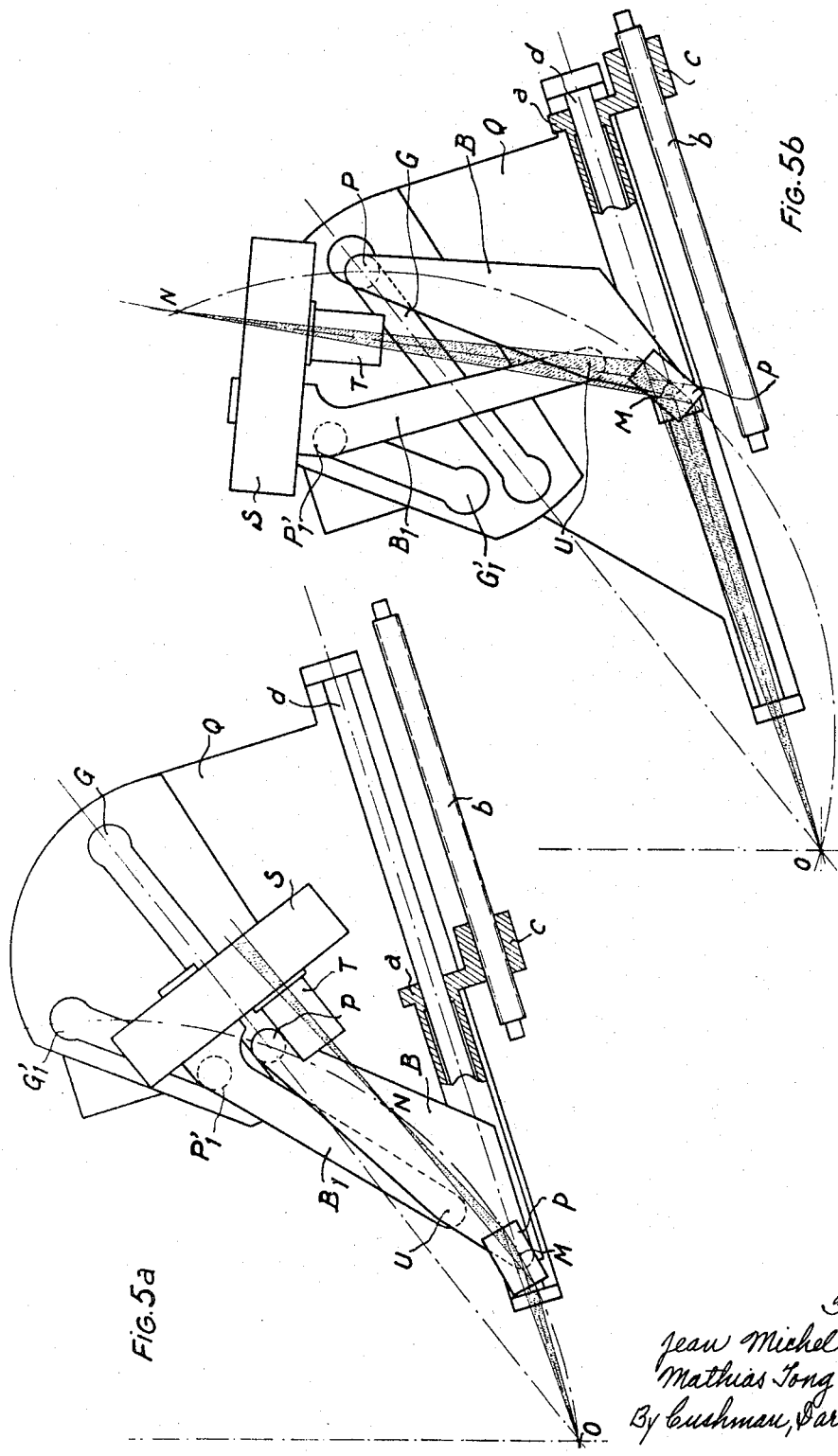

3,308,295
X-RAY SPECTROMETER WITH MEANS TO MAINTAIN THE DISTANCE BETWEEN THE CRYSTAL ANALYZER AND DETECTOR FIXED
Jean Michel Rouberol and Mathias Tong Yuan Tong, Paris, France, assignors to C.A.M.E.C.A.-Compagnie d'Applications Mecaniques a l'Electronique, au Cinema et a l'Atomistique, a corporation of France
Filed May 6, 1964, Ser. No. 365,440
Claims priority, application France, May 9, 1963, 934,199
4 Claims. (Cl. 250—49.5)

The present invention relates to X-ray spectrometers, more particularly of the type comprising a crystal which is cut and curved according to the Johann or Johansson method.

It is an object of the invention to provide a simplified spectrometer of the above type.

A monochromator X-ray spectrometer esentially comprises a crystal analyzer and a detector responsive to X-ray radiation, for example a proportional counter or scintillation counter.

If a crystal, the curvature radius of the atomic planes of which is 2R, is placed tangentially to a circle of radius R, passing through the X-ray source, the monochromatic radiation diffracted by the crystal is focused at a point of the circle of radius R, which circle is called the focal circle. If the crystal is then made to rotate about the center C of this circle, while remaining tangent thereto, the monochromatic radiations building up the radiations of the source are successively obtained, while the focal point of the diffracted rays rotates along the focal circle with an angular velocity which is twice that of the crystal.

The simplified spectrometer according to the invention is of the type wherein the center of the crystal moves along a straight line while to each position of the crystal corresponds one focal circle. Accordingly, to analyse the X-ray radiation emitted by the source, a cinematic system is necessary which is capable of simultaneously displacing the crystal along the focal circle while moving it along a straight line, rotating the detector about the same circle at twice the rate of the crystal rotation, and directing the detector for receiving the radiation diffracted by the crystal.

The simplified spectrometer according to the invention is based on the finding made by the applicants that the only motion requiring precision is that resulting in the displacement and the orientation of the crystal analyser; the resolving power depends on it.

In a spectrometer according to the invention, the detector is kept at a substantially constant distance from the crystal analyzer. With such an arrangement, it becomes necessary to provide the detector with a fairly large entrance slit which might result in increasing parasitic radiations reaching the detector.

However, by using as detector a proportional counter or a scintillation counter, these parasitic radiations can be eliminated and results, comparable to those achieved with very narrow entrance slits, can be obtained.

The invention will be better understood from the following description and appended drawings in which:

FIG. 1 is a schematic diagram showing the relative arrangement of the elements of a spectrometer with the detector located at the focal point;

FIG. 2 is an explanatory diagram illustrating the orientation of the crystal in the arrangement according to the invention;

FIGS. 3a and 3b illustrate, in an arrangement according to the invention, the extreme positions of the detector entrance slit with respect to the focal point;

FIGS. 5a and 5b are other views of a spectrometer according to the invention.

The same reference characters have been used throughout all the figures to designate the same elements.

Figure 4:
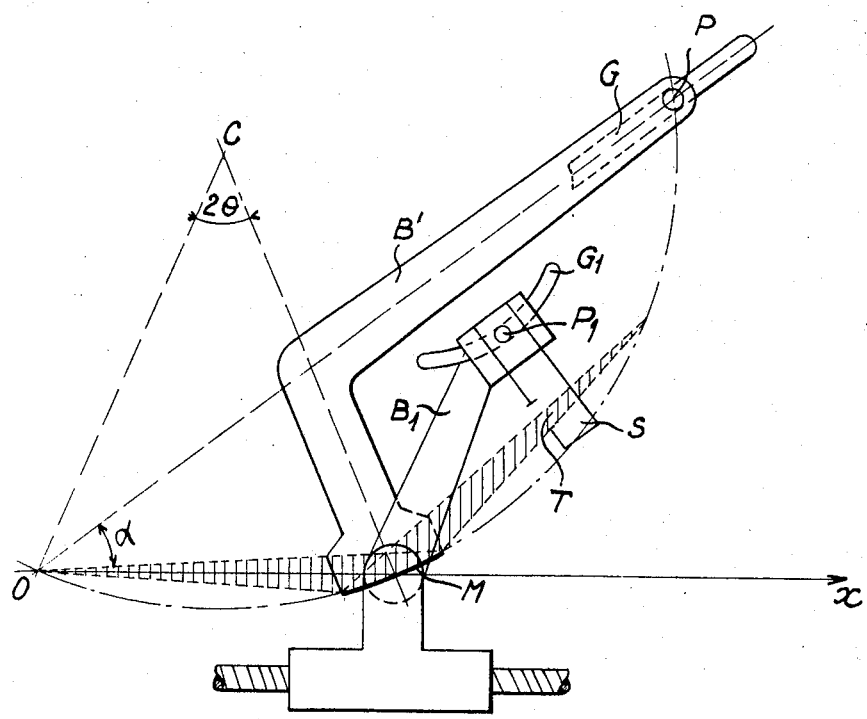
FIG. 4 shows very diagrammatically a spectrometer according to the invention.

In FIG. 1, a source O, for example a specimen excited by electron bombardment, emits X-rays toward a crystal analyzer whose reflecting surface has a center M and whose focal point is N. O, M and N lie on a circumference of center C, which is thus tangent to the crystal at M and whose diameter is equal to the radius of curvature 2R of the diffracting reticular planes, this being the focal circle.

In FIG. 2, the crystal is assumed to be displaced along the Ox axis. A rectilinear guide G, whose axis passes through O and makes with Ox an angle $\alpha$, guides an arm B, rigidly connected to the crystal at M and making angle $\alpha$ with the plane tangent at M to the crystal. A roller P, is, to this end, pivotally mounted at the end of arm B and its axis is at a distance $2R \sin \alpha$ from M.

It can be readily shown that for all the positions of point M on Ox, the crystal stays tangent to the focal circle, i.e. the circle of diameter 2R passing through O and M.

FIG. 3 shows the reflected radiation beam portion in the neighbourhood of the focal point N and of the entrance slit T of detector S. In FIG. 3a, the focal point N is located ahead of slit T and in FIG. 3b, behind this slit in the propagation direction.

In the spectrometer according to the invention the distance between the crystal and the entrance slit T is kept fairly constant and equal to the average between the distances corresponding to the minimum and the maximum angles of incidence for the considered analysis, i.e. to the extreme positions of M on the axis Ox in FIG. 2.

The spectrometer diagrammatically shown in FIG. 4 comprises an arm B' shaped somewhat as a bell crank. One end of arm B' carries the crystal M and its other end is provided with a roller P guided in a guide G.

The arrangement is such that, in the same manner as in FIG. 3, distance MP is equal to $2R \sin \alpha$.

A roller $P_1$ is mounted on detector S which is carried by an arm $B_1$ pivotally mounted at M. Roller $P_1$ is guided by a stationary guide $G_1$. The system operates as follows:

A correct position of the detector, i.e. such that for every position of M, i.e. for every value of angle $\theta$, the radiation reflected by M is received by the entrance slit T of detector S, is obtained by suitably designing guide $G_1$ which guides the assembly comprising arm $B_1$ and roller $P_1$. To this end guide $G_1$ has to be traced point by point. Since arm $B_1$ and detector S are rigidly connected, distance MT is constant. The crystal is displaced along axis Ox in any suitable manner, for example by means of a worm drive.

FIGS. 5a and 5b show the same spectrometer in two different positions. In addition to elements already described in FIGS. 1 to 4, the spectrometer of FIGS. 5a and 5b comprises a crystal holder P, in which crystal M is positioned and which is carried by arm B. Arm $B_1$ is pivotally mounted at U on arm B at same distance from point M to make the hinge simpler. In addition guide $G'_1$ is made rectilinear.

Guiding slots G and $G'_1$ are formed in a flange Q, solid with the spectrometer frame (not shown). The longitudinal displacement of crystal M is insured in the following manner. The crystal holder P is pivotally mounted on a slider $a$ which is, for example in the shape of a tubular member slidably mounted on a rod $d$. Slider $a$ is driven by a worm $b$ which meshes with a nut $c$ solid with slider $a$. The arrangement is such that the center M of the crystal is displaced along the axis Ox of FIG. 4.

By suitably selecting the position of pivot U and of roller P' guide G'$_1$ may be made rectiliner. Distance MT is then no longer constant and the entrance slit T no longer strictly normal to the radiation beam. However, this is practically not a drawback and the afforded precision sufficient for all practical purposes.

The present invention is of course not limited to the particular arrangements shown and described which were given solely by way of example.

What is claimed is:

1. A spectrometer for analysing the radiation emitted by an X-ray source, comprising: a crystal analyser having a center; a detector having an entrance slit; a crystal holder; means for displacing said holder along a first axis comprising said source; a first arm having a first end rigidly connected to said holder and a second end; means for guiding said second end along a second axis comprising said source; a second arm having a first end carrying said detector and a second end pivotally mounted on said first arm; and means for guiding said first end of said second arm.

2. A spectrometer for analysing the radiation emitted by an X-ray source, comprising: a crystal analyzer having a center; a detector having an entrance slit; a crystal holder; means for displacing said holder, along a first axis comprising said source; a first arm rigidly connected to said holder; a first guide having an axis extending through said source and making a fixed angle $\alpha$ with said first axis, said arm having a point thereof guided by said guide, the distance between said point and said center being equal to $2R \sin \alpha$, $2R$ being the radius of curvature of the atomic planes of said crystal; a second arm carrying said detector, said first and second arms being pivotally connected; and a second guide for guiding said second arm.

3. A spectrometer according to claim 2 wherein said second guide is rectilinear.

4. A spectrometer according to claim 3 comprising a flange wherein said guides are formed.

References Cited by the Examiner

UNITED STATES PATENTS 3,123,710   3/1964   Neuhaus _____ 250—51.5

RALPH G. NILSON, *Primary Examiner.*

W. F. LINDQUIST, *Assistant Examiner.*